United States Patent
Tamaru et al.

(10) Patent No.: US 11,100,340 B2
(45) Date of Patent: Aug. 24, 2021

(54) LINE DETECTOR FOR VEHICLE AND METHOD FOR DETECTING LINE FOR VEHICLE

(71) Applicant: MAZDA MOTOR CORPORATION, Hiroshima (JP)

(72) Inventors: Junki Tamaru, Aki-gun (JP); Takayuki Moritani, Hiroshima (JP); Hiroyuki Ueda, Hiroshima (JP); Hideaki Tamazumi, Hiroshima (JP); Yoshihiro Yamamoto, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 94 days.

(21) Appl. No.: 16/448,009

(22) Filed: Jun. 21, 2019

(65) Prior Publication Data
US 2020/0005053 A1    Jan. 2, 2020

(30) Foreign Application Priority Data

Jun. 29, 2018  (JP) .............................. JP2018-124156

(51) Int. Cl.
*G06K 9/00* (2006.01)
(52) U.S. Cl.
CPC ................................ G06K 9/00798 (2013.01)
(58) Field of Classification Search
CPC .. G06K 9/00798; G06K 9/209; G06K 9/6292; G01C 11/08
See application file for complete search history.

(56) References Cited

U.S. PATENT DOCUMENTS

| 9,690,996 B2* | 6/2017 | Utagawa | G06K 9/00812 |
| 10,614,320 B2* | 4/2020 | Yang | G06K 9/00798 |
| 2005/0273260 A1* | 12/2005 | Nishida | B60Q 1/346 701/301 |
| 2015/0302574 A1* | 10/2015 | Muramatsu | B62D 15/0275 348/148 |
| 2015/0317526 A1* | 11/2015 | Muramatsu | G06K 9/00798 348/148 |
| 2015/0336510 A1* | 11/2015 | Imai | G06T 7/73 348/148 |
| 2016/0356005 A1* | 12/2016 | Dolinar | E01C 23/22 |

(Continued)

FOREIGN PATENT DOCUMENTS

| EP | 35557529 | * 10/2019 |
| JP | H11-167636 A | 6/1999 |

*Primary Examiner* — Bobbak Safaipour
(74) *Attorney, Agent, or Firm* — Studebaker & Brackett PC

(57) ABSTRACT

A line detector apparatus and method on a vehicle for detecting a line on a road with a higher degree of accuracy. The vehicle includes front, right-side and left-side image capturing sensors mounted on a vehicle and respectively capture an image, including a road surface, at the front and right and left sides of the vehicle to respectively generate front, right-side and left-side images. The line detector includes a processor that calculates a line on a road as a first line from the front image, the line on the road as a second line from the right-side image, and the line on the road as a third line from the left-side image. The processor selects one of multiple mutually-different algorithms based on the first to third lines, and calculates the line on the road based on the first to third lines by using the selected algorithm.

10 Claims, 6 Drawing Sheets

(56) References Cited

U.S. PATENT DOCUMENTS

| | | | |
|---|---|---|---|
| 2017/0043772 A1* | 2/2017 | Watanabe | B60W 10/20 |
| 2018/0180422 A1* | 6/2018 | Naito | G06T 7/74 |
| 2018/0229770 A1* | 8/2018 | Kataoka | B62D 15/029 |
| 2019/0126775 A1* | 5/2019 | Han | B60L 58/13 |
| 2020/0193174 A1* | 6/2020 | Machii | G06K 9/46 |

* cited by examiner

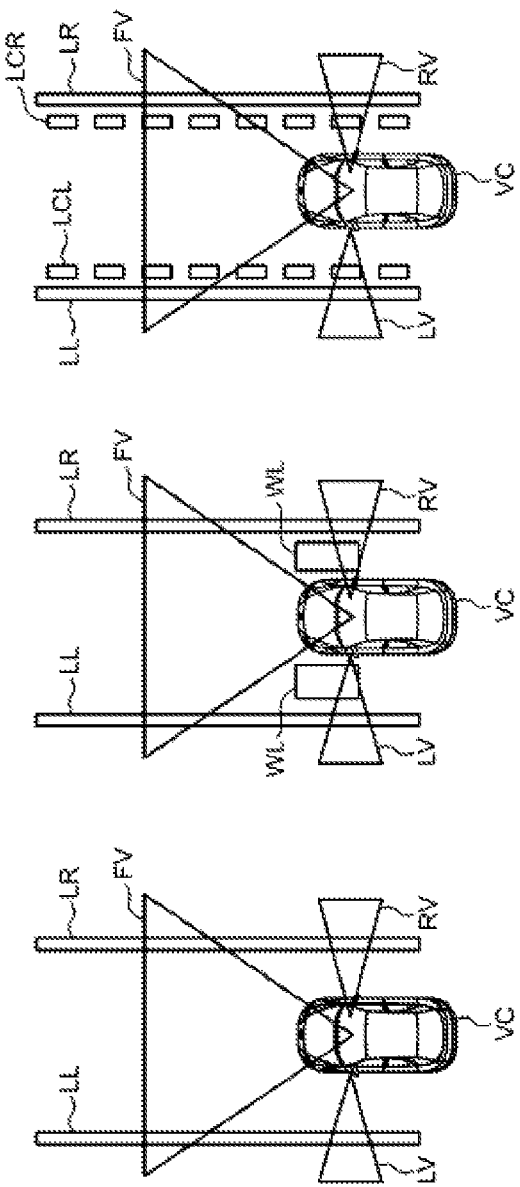

LINE DETECTOR FOR VEHICLE AND METHOD FOR DETECTING LINE FOR VEHICLE

BACKGROUND

Technical Field

The present disclosure relates to a line detector for a vehicle that detects a line on a road and to a method for detecting a line for a vehicle.

Background Art

In recent years, in order to execute vehicle control such as driver assistance and automated driving, techniques of detecting lines on roads such as a roadway center line (a center line) and a roadway boundary line (a lane marking) have been researched and developed, and one of such techniques is disclosed in Japanese Patent Laid-Open publication No. JP-A-11-167636.

A line detector for a vehicle disclosed in the above-described patent document includes first capturing means that captures an image of a road ahead of a vehicle; second capturing means that captures an image of a road immediately below a lateral side of the vehicle; first detecting means that detects a line on a road from the image acquired from one of the first capturing means and the second capturing means; and second detecting means that detects a line on the road in the image acquired from the other capturing means on the basis of a detected line position. More specifically, for example, in the case where a white line on the road cannot clearly be acquired from a front image, which is acquired by the first capturing means, for example, due to specular reflection of sunlight on the water-covered road, the line detector for the vehicle disclosed in Japanese Patent Laid-Open publication No. JP-A-11-167636 detects the white line from the image of the road immediately below the lateral side, which is acquired by the second capturing means, estimates a white line position in the front image on the basis of this detection result, and detects the white line from the front image on the basis of this estimation result by pattern matching, for example (for example, see paragraph [0018], paragraph [0020], and paragraph [0023] in Japanese Patent Laid-Open publication No. JP-A-11-167636).

There is a case where cameras of the same product type are used as a camera (a front camera) that captures the image in front of the vehicle and as a camera (a lateral camera) that captures the image on the lateral side of the vehicle, so as to reduce cost of the cameras, facilitate handling of the cameras, and the like. In such a case, while the front camera captures the image of a relatively large area that is wide in a horizontal direction and extends from a near side to a far side in a travel direction, the lateral camera captures the image of a relatively small area near the vehicle. Accordingly, an object area included per pixel is larger in the image (the front image) captured by the front camera than in the image (the lateral image) captured by the lateral camera. As a result, while the line position on the road can be detected with a relatively high degree of accuracy from the lateral image, the line position in the front image is less clear than that in the side image. Thus, there is a case where detection accuracy of the line on the road from the front image is low. In the case where the line detector for the vehicle disclosed in Japanese Patent Laid-Open publication No. JP-A-11-167636 attempts to detect the line at the estimated position by using the unclear image, the detection accuracy of the line on the road becomes low in a similar manner.

Meanwhile, because the lateral camera captures the image of the relatively small area, it may be difficult to determine whether the line detected from the lateral image is either a single line or double lines. That is, detection accuracy of each of the single line and the double lines by the lateral camera (the lateral image) is low.

SUMMARY

The present disclosure is disclosure that has been made in view of the above-described circumstances, and provides a line detector for a vehicle and a method for detecting a line for a vehicle capable of detecting a line on a road with a high degree of accuracy.

As a result of intensive studies, the present inventors have found that the above object is achieved by the following present disclosure.

A line detector for a vehicle according to one aspect of the present disclosure includes a first image capturing sensor that is mounted on a vehicle and captures an image in front of the vehicle in a manner to include a road surface, so as to generate a front image; and a second image capturing sensor that is mounted on the vehicle and captures an image on one lateral side of the vehicle in the manner to include the road surface, so as to generate one lateral image. The line detector further includes a first line extraction processing section that calculates a line on a road as a first line from the front image generated by the first image capturing sensor; a second line extraction processing section that calculates a line on the road as a second line from the one lateral image generated by the second image capturing sensor; and a line determination processing section that selects one algorithm from multiple mutually-different algorithms for determining the line on the road on the basis of the first and second lines respectively calculated by the first and second line extraction processing sections, so as to finally calculate the line on the road on the basis of the first and second lines by using the selected algorithm.

Such a line detector for the vehicle selects one algorithm from the multiple mutually-different algorithms for determining the line on the road, and finally calculates the lines on the road on the basis of the first and second lines by using the selected algorithm. Thus, the algorithm that is suited to finally calculate the lines on the road can be selected from the multiple algorithms, and the lines on the road can be detected with a high degree of accuracy by using this suited algorithm.

In another aspect, the above-described line detector for the vehicle further includes a third image capturing sensor that is mounted on the vehicle and captures an image on the other lateral side of the vehicle in the manner to include the road surface, so as to generate the other lateral image; and a third line extraction processing section that calculates the line on the road as a third line from the other lateral image generated by the third image capturing sensor. The line determination processing section selects one algorithm from the multiple algorithms on the basis of the first to third lines respectively calculated by the first to third line extraction processing sections, and finally calculates the line on the road on the basis of the first to third lines by using the selected algorithm.

Such a line detector for the vehicle selects one algorithm from the multiple mutually-different algorithms for determining the line on the road and finally calculates the line on the road on the basis of the first to third lines by using the selected algorithm. Thus, the algorithm that is suited to finally calculate the lines on the road can be selected from the multiple algorithms, and the lines on the road can be detected with the high degree of accuracy by using this suited algorithm.

In another aspect, in the above-described line detector for the vehicle, the lines on the road include a right and left pair of the primary lines representing boundaries of a lane; and a secondary line other than the right and left pair of the primary lines. The first line extraction processing section calculates the right and left pair of the primary lines on the road as a right and left pair of the first lines from the front image captured by the first image capturing sensor, and the line determination processing section selects one algorithm from the multiple algorithms on the basis of the right and left pair of the first lines, the second line, and the third line respectively calculated by the first to third line extraction processing sections, and finally calculates the right and left pair of the primary lines on the road on the basis of the right and left pair of the first lines, the second line, and the third line by using the selected algorithm.

Such a line detector for the vehicle can detect the right and left pair of the primary lines representing the boundaries of the lane with the high degree of accuracy.

In another aspect, in the above-described line detector for the vehicle, the multiple algorithms include a first algorithm that regards the second and third lines respectively calculated by the second and third line extraction processing sections as the secondary lines (first and second secondary lines included in the secondary lines), and sets the right and left pair of the first lines calculated by the first line extraction processing section as the right and left pair of the primary lines on the road, so as to finally calculate the right and left pair of the primary lines on the road.

Such a line detector for the vehicle sets the right and left pair of the first lines calculated by the first line extraction processing section as the right and left pair of the primary lines on the road without using the second and third lines, which are respectively calculated by the second and third line extraction processing sections and regarded as the secondary lines. Thus, the right and left pair of the primary lines on the road representing the boundaries of the lane can be detected with the high degree of accuracy.

In another aspect, in the above-described line detector for the vehicle, the secondary line includes a crosswalk line that represents a crosswalk and includes multiple lines marked on the basis of a specified code. The first algorithm calculates a first lane width of the lane on the basis of the right and left pair of the first lines calculated by the first line extraction processing section, calculates a second lane width of the lane on the basis of the second and third lines respectively calculated by the second and third line extraction processing sections. The first algorithm regards the second and third lines respectively calculated by the second and third line extraction processing sections as the crosswalk lines in the case where a difference between the calculated first lane width and the calculated second lane width falls within a specified first range based on the code or in the case where the second line calculated by the second line extraction processing section is located on an inner side from one first line of the right and left pair of the first lines, which is calculated by the first line extraction processing section, by a specified threshold value based on the code or greater and/or in the case where the third line calculated by the third line extraction processing section is located on an inner side from the other first line of the right and left pair of the first lines, which is calculated by the first line extraction processing section, by the threshold value or greater, sets the right and left pair of the first lines calculated by the first line extraction processing section as the right and left pair of the primary lines on the road, so as to finally calculate the right and left pair of the primary lines on the road. Preferably, the code is a code of a traffic sign and orders related to the traffic sign and a mark line based on the Road Act, the first range is 0.65 m to 1 m, and the threshold value is 0.35 m.

Such a line detector for the vehicle sets the right and left pair of the first lines calculated by the first line extraction processing section as the right and left pair of the primary lines on the road even in the case where the crosswalk line is marked on the road surface. Thus, the right and left pair of the lines representing the boundaries of the lane can accurately be detected with the high degree of accuracy.

In another aspect, in the above-described line detector for the vehicle, the right and left pair of the primary lines on the road are a roadway center line and a lane boundary line or a pair of the lane boundary lines marked on the basis of the specified code, and the multiple algorithms include a second algorithm that calculates the first lane width of the lane on the basis of the right and left pair of the first lines calculated by the first line extraction processing section. The second algorithm calculates the second lane width of the lane on the basis of the second and third lines respectively calculated by the second and third line extraction processing sections, and finally calculates the right and left pair of the primary lines on the road on the basis of the right and left pair of the first lines calculated by the first line extraction processing section and the second and third lines respectively calculated by the second and third line extraction processing sections in the case where the calculated difference between the first lane width and the second lane width does not fall within a specified second range based on the code. Preferably, the code is the above-described order, and the second range is 0.1 m to 0.65 m.

Such a line detector for the vehicle uses not only the right and left pair of the first lines calculated by the first line extraction processing section but also the second and third lines, which are respectively calculated by the second and third line extraction processing sections and regarded as the right and left pair of the primary lines. Thus, the right and left pair of the lines on the road representing the boundaries of the lane can be detected with the high degree of accuracy.

In another aspect, in the above-described line detector for the vehicle, the right and left pair of the primary lines on the road are a roadway center line and a lane boundary line or a pair of the lane boundary lines marked on the basis of the specified code, the secondary line includes an auxiliary line that is parallel with the primary line and is marked at a specified distance from the primary line, and the multiple algorithms include a third algorithm that calculates the first lane width of the lane on the basis of the right and left pair of the first lines calculated by the first line extraction processing section. The third algorithm calculates the second lane width of the lane on the basis of the second and third lines respectively calculated by the second and third line extraction processing sections, regards at least one of the second and third lines respectively calculated by the second and third line extraction processing sections as the auxiliary line in the case where the calculated difference between the first lane width and the second lane width falls within a specified second range based on the code, estimates the primary line related to the at least one of the second and third lines, which is regarded as the auxiliary line, as an estimated line on the basis of the at least one of the second and third lines regarded as the auxiliary line and the specified distance, and finally calculates the right and left pair of the primary lines on the basis of the right and left pair of the first lines calculated by the first line extraction processing section and the estimated line related to the at least one of the second and third lines regarded as the auxiliary line. Preferably, the code is the above-described order, the second range is 0.1 m to 0.65 m, and the fourth range is 0.1 m to 0.35 m.

Such a line detector for the vehicle estimates the primary line as the estimated line on the basis of at least one of the second and third lines, which are respectively calculated by the second and third line extraction processing sections, the at least one of the second and third lines being regarded as the auxiliary line. Then, the line detector for the vehicle uses not only the right and left pair of the first lines calculated by the first line extraction processing section but also the estimated line. Thus, the right and left pair of the lines on the road representing the boundaries of the lane can be detected with the high degree of accuracy.

In another aspect, in the above-described line detector for the vehicle, the lines on the road include a right and left pair of the primary lines representing boundaries of a lane; and a secondary line other than the right and left pair of the primary lines. The secondary line includes an auxiliary line that is parallel with the primary line and is marked at a specified distance from the primary line. The first line extraction processing section calculates one of the right and left pair of the primary lines on the road as the first line from the front image captured by the first image capturing sensor, and the multiple algorithms include a fourth algorithm that sets, of the second and third lines respectively calculated by the second and third line extraction processing sections, the line corresponding to the one of the right and left pair of the primary lines on the road as a fourth line. The fourth algorithm regards the fourth line as the auxiliary line in the case where the fourth line is located on an inner side from the first line by a specified third range based on the specified code for a specified time or longer and in the case where the fourth line is located on the inner side from the first line by a specified fourth range based on the code, and estimates the one primary line as an estimated line on the basis of the fourth line and the specified distance, so as to finally calculate one of the right and left pair of the primary lines on the road on the basis of the one first line and the estimated line. Preferably, the code is the above-described order, the third range is 0.1 m to 1 m, and the fourth range is 0.1 m to 0.35 m.

In the case where one of the right and left pair of the primary lines representing the boundaries of the lane is calculated in the first to third line extraction processing sections, such a line detector for the vehicle estimates the one primary line as the estimated line on the basis of the fourth line regarded as the auxiliary line, and uses not only the one first line calculated by the first line extraction processing section but also the estimated line. Thus, the right and left pair of the primary lines on the road representing the boundaries of the lane can be detected with the high degree of accuracy.

In another aspect, in the above-described line detector for the vehicle, the secondary line is a crosswalk line that represents a crosswalk and includes multiple lines marked on the basis of the specified code. In the case where the fourth line is not located on the inner side from the first line by the specified third range based on the specified code for the specified time or longer and/or in the case where the fourth line is not located on the inner side from the first line by the specified fourth range based on the code, and in the case where the fourth line is located on the inner side from the first line by the fourth range, the fourth algorithm further regards the fourth line as the crosswalk line, and finally calculates one of the right and left pair of the primary lines on the road by the one first line itself.

Even in the case where the crosswalk line is marked near the one primary line on the road surface, such a line detector for the vehicle finally calculates one of the right and left pair of the primary lines by the one first line itself. Thus, the right and left pair of the lines on the road representing the boundaries of the lane can be detected with the high degree of accuracy.

In another aspect, in the above-described line detector for the vehicle, in the case where the fourth line is not located on the inner side from the first line by the specified third range based on the specified code for the specified time or longer and/or in the case where the fourth line is not located on the inner side from the first line by the specified fourth range based on the code. In the case where the fourth line is not located on the inner side from the first line by the fourth range, the fourth algorithm further finally calculates one of the right and left pair of the primary lines on the road on the basis of the fourth line and the one first line.

Such a line detector for the vehicle uses not only the one first line but also the fourth line regarded as the one primary line. Thus, the right and left pair of the primary lines on the road representing the boundaries of the lane can be detected with the high degree of accuracy.

A method for detecting a line for a vehicle according to another aspect of the present disclosure includes a first image capturing step of capturing an image in front of a vehicle in a manner to include a road surface, so as to generate a front image; and a second image capturing step of capturing an image on one lateral side of the vehicle in the manner to include the road surface, so as to generate one lateral image. The method further includes a first line extraction processing step of calculating a line on a road as a first line from the front image generated by the first image capturing step; a second line extraction processing step of calculating a line on the road as a second line from the one lateral image generated by the second image capturing step; and a line determination processing step of selecting one algorithm from multiple mutually-different algorithms for determining the line on the road on the basis of the first and second lines respectively calculated in the first and second line extraction processing steps, so as to finally calculate the line on the road on the basis of the first and second lines by using the selected algorithm.

In the method for detecting the line for the vehicle, one algorithm is selected from the multiple mutually-different algorithms for determining the line on the road, and the line on the road is finally calculated on the basis of the first and second lines by using the selected algorithm. Thus, the algorithm that is suited to finally calculate the lines on the road can be selected from the multiple algorithms, and the lines on the road can be detected with the high degree of accuracy by using this suited algorithm.

According to the line detector for the vehicle and the method for detecting the line for the vehicle according to the present disclosure, the lines on the road can be detected with the high degree of accuracy.

BRIEF DESCRIPTION OF THE DRAWINGS

FIGS. 6A-6C are views illustrating the operation related to the line detection in the overall operation.

DETAILED DESCRIPTION

Figure 1:
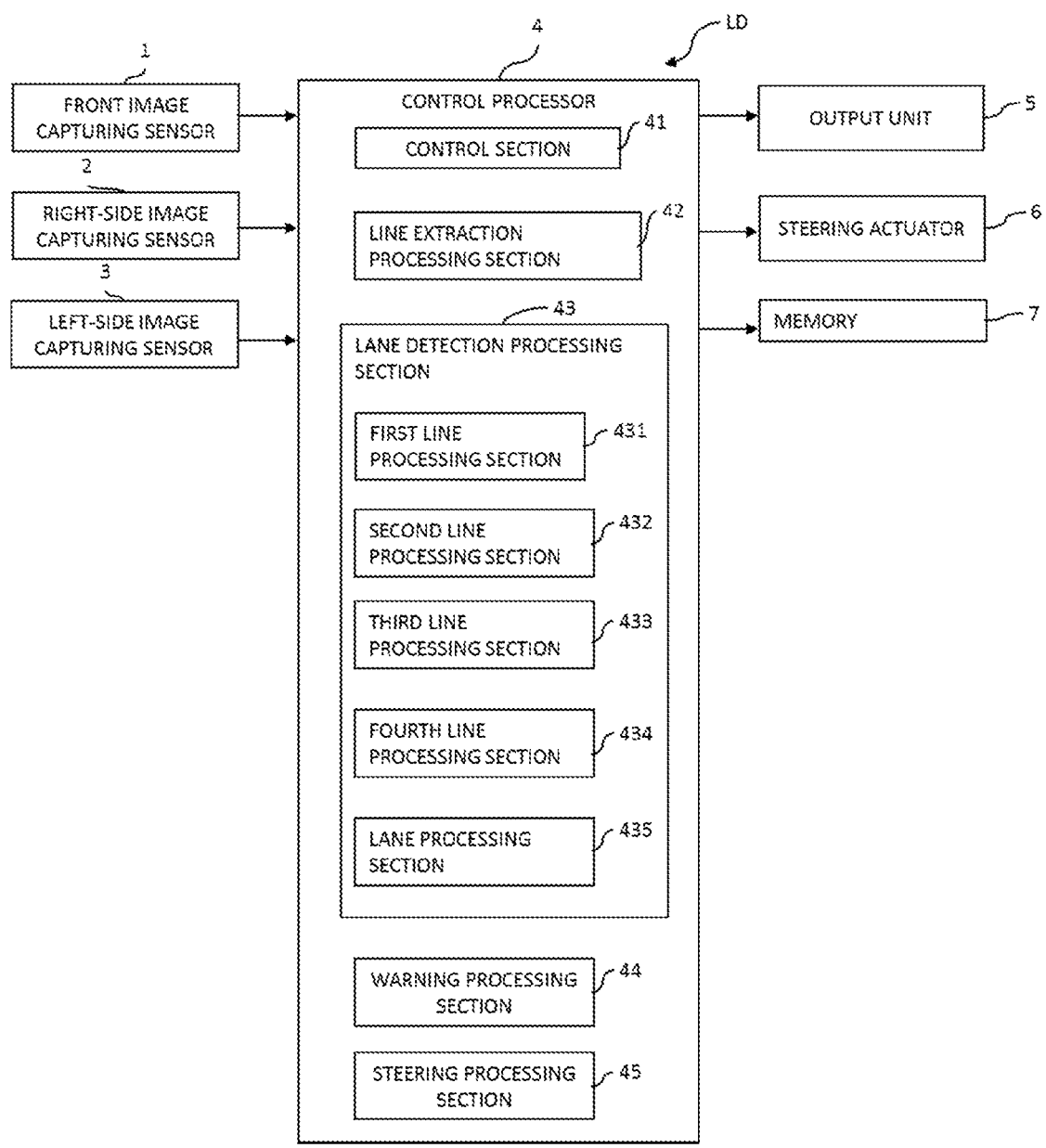
FIG. 1 is a block diagram illustrating a configuration of a line detector for a vehicle in an embodiment.

A description will hereinafter be made on an embodiment according to the present disclosure with reference to the drawings. Note that a component denoted by the same reference sign and numeral in the drawings indicates the same component, and the description thereon will not be repeated. In the present specification, in the case where the components are collectively referred, such components are denoted by the reference sign and numeral from which an index is deleted. Meanwhile, in the case where the components are individually referred, each of the components is denoted by the reference sign and numeral with the index.

FIG. 1 is a block diagram illustrating a configuration of a line detector for a vehicle in the embodiment. The line detector for the vehicle in this embodiment is an apparatus that is mounted on a vehicle such as a passenger car, a truck, a forklift, a guided vehicle for factory parts or the like, and that detects a line marked on a road surface. For example, as illustrated in FIG. 1, a line detector for a vehicle LD includes a front image capturing sensor 1, a right-side image capturing sensor 2, a left-side image capturing sensor 3, a control processor 4, and a memory 7. In this embodiment, in order to use a detection result, the line detector for the vehicle LD in the embodiment further includes an output unit 5 and a steering actuator 6.

Each of the front image capturing sensor 1, the right-side image capturing sensor 2, and the left-side image capturing sensor 3 is a device that is connected to the control processor 4 and generates an image in accordance with control by the control processor 4. For example, each of the front image capturing sensor 1, the right-side image capturing sensor 2, and the left-side image capturing sensor 3 is a digital camera that includes: an imaging optical system that forms an optical image of an object on a specified imaging plane; an area image sensor that is disposed such that a light receiving surface thereof matches the imaging plane, and converts the optical image of the object into an electrical signal; an image processing section that executes image processing on output of the area image sensor to generate image data that is data representing an image of the object; and the like. It is preferred that these front image capturing sensor 1, right-side image capturing sensor 2, and left-side image capturing sensor 3 are products of the same type so that cost thereof can be reduced by purchasing multiple units of such products from a single seller or by manufacturing multiple units of such products and so that handling thereof can be facilitated by using such image capturing sensors of the single type.

The front image capturing sensor 1 is mounted on the vehicle in a manner to capture an image in front of the vehicle including the road surface. For example, in the vehicle, the front image capturing sensor 1 is disposed on a roof surface (a roof inner surface) near a front windshield such that an image capturing direction (an optical axis direction) thereof is directed obliquely downward and thus the front image capturing sensor 1 captures the image in front of the vehicle including the road surface. In this way, the front image capturing sensor 1 captures the image in front of the vehicle including the road surface to generate a front image.

The right-side image capturing sensor 2 is mounted on the vehicle in a manner to capture an image of one lateral side (a right side herein) of the vehicle including the road surface. For example, the right-side image capturing sensor 2 is disposed in a right door mirror of the vehicle such that an object lens thereof is installed in the right door mirror to face the outside via protective glass and that an image capturing direction (an optical axis direction) thereof is directed outward and obliquely downward to separate from a side surface of the vehicle and thus the right-side image capturing sensor 2 captures the image of the right side of the vehicle including the road surface. In this way, the right-side image capturing sensor 2 captures the image of the right side of the vehicle in the manner to include the road surface, so as to generate a right-side image.

The left-side image capturing sensor 3 is mounted on the vehicle in a manner to capture an image of the other lateral side (a left side herein) of the vehicle including the road surface. For example, the left-side image capturing sensor 3 is disposed in a left door mirror of the vehicle such that an object lens thereof is installed in the left door mirror to face the outside via protective glass and that an image capturing direction (an optical axis direction) thereof is directed outward and obliquely downward to separate from a side surface of the vehicle and thus the left-side image capturing sensor 3 captures the image of the left side of the vehicle including the road surface. In this way, the left-side image capturing sensor 3 captures the image of the left side of the vehicle including the road surface to generate a left-side image.

Note that, in this embodiment, the front image capturing sensor 1 corresponds to an example of the first image capturing sensor. The right-side image capturing sensor 2 corresponds to an example of the second capturing sensor, and the right-side image corresponds to an example of the one lateral image. The left-side image capturing sensor 3 corresponds to an example of the third image capturing sensor, and the left-side image corresponds to an example of the other lateral image.

The output unit 5 is a device that is connected to the control processor 4 and outputs specified information in accordance with the control by the control processor 4. The specified information may be any of various types of information. For example, in this embodiment, the specified information is information on a warning about lane departure, information on a detected line (a detection result), which will be described below, and the like. For example, the output unit 5 is a buzzer, a speaker, or the like that generates and outputs sound corresponding to an electrical signal representing the sound in accordance with the control by the control processor 4, and outputs warning sound, a warning message, or the like to warn about the lane departure. Alternatively, for example, the output unit 5 is a display such as a liquid crystal display or an organic EL display that displays the specified information in accordance with the control by the control processor 4, and outputs and displays the detection result, the warning message, and the like.

The steering actuator 6 is a device that is connected to the control processor 4 and steers the vehicle or assists with steering of the vehicle in accordance with the control by the control processor 4. For example, the steering actuator 6 controls steering in accordance with the control by the control processor 4 such that the vehicle keeps the lane.

The memory 7 is a circuit that is connected to the control processor 4 and stores various specified programs and various types of specified data in accordance with the control by the control processor 4. For example, the various specified programs include control processing programs that are: a control program that controls each of the units 1 to 3 and 5 to 7 in the line detector for the vehicle LD in accordance with a function of each of the units; a line extraction processing program that calculates the line on the road from each of the front image, the right-side image, and the left-side image; a lane detection processing program that uses multiple mutually-different algorithms for determining the line on the road to detect the lane on the basis of the line calculated by the line extraction processing program; a warning processing program that causes the output unit 5 to warn about the lane departure on the basis of the lane detected by the lane detection processing program; a steering control program that causes the steering actuator 6 to control steering on the basis of the lane detected by the lane detection processing program such that the vehicle (a host vehicle) keeps the lane; and the like. The various types of the specified data include data required for the execution of each of the programs, and the like. The data required for the execution of each of the programs include data on first to fourth ranges, which will be described below, data on a threshold value, which will be described below, data on the warning sound (or the warning message), and the like. For example, the memory 7 includes read only memory (ROM) that is a nonvolatile storage element, electrically erasable programmable read only memory (EEPROM) that is a rewritable nonvolatile storage element, and the like. In addition, the memory 7 includes random access memory (RAM) that serves as so-called working memory for the control processor 4 and stores data generated during the execution of the specified programs, and the like.

The control processor 4 is a circuit for controlling each of the units 1 to 3 and 5 to 7 in the line detector for the vehicle LD in accordance with the function of each of the units so as to calculate the line on the road. For example, the control processor 4 is configured to include a central processing unit (CPU) and peripheral circuits thereof. The control processor 4 functionally includes a control section 41, a line extraction processing section 42, a lane detection processing section 43, a warning processing section 44, and a steering processing section 45 as a result of the execution of the control processing programs. The lane detection processing section 43 functionally includes a first line processing section 431, a second line processing section 432, a third line processing section 433, a fourth line processing section 434, and a lane processing section 435.

The control section 41 controls each of the units 1 to 3 and 5 to 7 in the line detector for the vehicle LD in accordance with the function of each of the units so as to control the entire line detector for the vehicle LD.

The line extraction processing section 42 calculates, as a first line, the line on the road from the front image generated by the front image capturing sensor 1, calculates, as a second line, the line on the road from the right-side image generated by the right-side image capturing sensor 2, and calculates, as a third line, the line on the road from the left-side image generated by the left-side image capturing sensor 3. A known processing method is used for line extraction processing to extract the lines from the images. For example, as disclosed in Japanese Patent Laid-Open publication No. JP-A-11-167636, a template image showing a white line is prepared in advance, and then the white line is calculated by using a template matching method for matching the template image and the image acquired from the camera and thereby detecting a white line position. Alternatively, for example, as disclosed in JP-A-7-85249, a luminosity change in a lateral direction is searched within a white line search area. Then, a portion with the extremely small luminosity change is determined as a road portion while a portion that is adjacent to the road portion with the extremely small luminosity change and has the large luminosity change is determined as the white line. Further alternatively, for example, as disclosed in JP-A-2007-220013, a structure as a candidate for the white line is detected from an image of a travel road by edge detection. Then, it is determined whether a specified structure exists at each of multiple specified relative positions to a position of the structure as the candidate for the white line. Based on this determination result, it is determined whether the structure as the candidate for the white line is the white line. Here, the multiple specified relative positions and the specified structure are defined on the basis of a unique relative positional relationship among the multiple structures on the road.

Note that the line extraction processing section 42 is an example of the first line extraction processing section, an example of the second line extraction processing section, and an example of the third line extraction processing section.

The lane detection processing section 43 selects one algorithm from the multiple mutually-different algorithms for determining the line on the road, which are stored in the memory 7 in advance, on the basis of the first to third lines calculated by the line extraction processing section 42, finally calculates the line on the road on the basis of the first to third lines by using this selected algorithm, and detects the lane on the basis of this calculated line on the road. The line on the road is a line related to a road marking, a mark line, or the like marked on the road surface. In this embodiment, the lines on the roads include primary lines (a right and left pair of primary lines in this embodiment) and secondary lines other than the primary lines, for example. Accordingly, the line extraction processing section 42 calculates, as a right and left pair of the first lines, the right and left pair of the primary lines on the road from the front image captured by the front image capturing sensor 1. Preferably, the right and left pair of the primary lines are a roadway center line and a lane boundary line that are marked on the basis of a specified code, or a pair of the lane boundary lines. Preferably, the secondary lines include: an auxiliary line that is parallel with the primary line and is marked at a specified distance from the primary line in a lane width direction; and a crosswalk line that represents a crosswalk and includes multiple lines marked on the basis of the specified code. An arbitrary code may be adopted as the specified code. For example, the specified codes are a code of a traffic sign and orders related to the traffic sign and the mark line based on the Road Act of Japan. For example, a lane width D1 is 3.0 m to 3.5 m, each width d1 of the roadway center line, the lane boundary line, and the auxiliary line is 0.1 m to 0.15 m, a distance d2 between the lane boundary line and the auxiliary line is the same as each of the widths d1 of the lane boundary line and the auxiliary line (d1=d2), a width D2 of each of the crosswalk lines is 0.45 m to 0.5 m, and each distance D3 between the crosswalk lines is 0.45 m to 0.5 m.

More specifically, the lane detection processing section 43 selects one algorithm from the multiple algorithms on the basis of the first and second lines calculated by the line extraction processing section 42, finally calculating one line on the road, in this embodiment, the right primary line of the right and left pair of the primary lines on the basis of the first and second lines by using this selected algorithm, selects one algorithm from the multiple algorithms on the basis of the first and third lines calculated by the line extraction processing section 42, finally calculating the other line on the road, in this embodiment, the left primary line of the right and left pair of the primary lines on the basis of the first and third lines by using this selected algorithm, and detects the lane on the basis of the right and left pair of these calculated primary lines on the road. Preferably, the multiple algorithms include first to fourth algorithms, for example.

The first algorithm is an algorithm that regards the second line as the secondary line and sets the first line as the primary line on the road, so as to finally calculate the primary line on the road, in this embodiment, an algorithm that regards the second and third lines as the secondary lines and sets the right and left pair of the first lines as the right and left pair of the primary lines on the road, so as to finally calculate the right and left pair of the primary lines on the road. More specifically, in this embodiment, the first algorithm calculates a first lane width of the lane on the basis of the right and left pair of the first lines calculated by the line extraction processing section 42, and calculates a second lane width of the lane on the basis of the second and third lines calculated by the line extraction processing section 42. In the case where a difference between these calculated first lane width and second lane width (for example, a subtraction result acquired by subtracting the second lane width from the first lane width) falls within the specified first range based on the code, or in the case where the second line calculated by the line extraction processing section 42 is located on an inner side from one of the right and left pair of the first lines calculated by the line extraction processing section 42 by a specified threshold value based on the code or greater and/or in the case where the third line calculated by the line extraction processing section 42 is located on the inner side from the other of the right and left pair of the first lines calculated by the line extraction processing section 42 by the threshold value or greater, the first algorithm regards the second and third lines calculated by the line extraction processing section 42 as the crosswalk line, and sets the right and left pair of the first lines calculated by the line extraction processing section 42 as the right and left pair of the primary lines on the road, so as to finally calculate the right and left pair of the primary lines on the road. For example, in the case where the specified code is the above-described order, each of the lines is stipulated as described above. Accordingly, the specified first range based on the code is 0.65 m to 1 m, and the specified threshold value based on the code is 0.35 m. Note that the second to fourth ranges, which will be described below, are similarly set in consideration of the above code.

The second algorithm is an algorithm that regards the second line as the primary line and finally calculates the primary line on the road on the basis of the first line and the second line, in this embodiment, an algorithm that regards the second and third lines as the right and left pair of the primary lines and finally calculates the right and left pair of the primary lines on the road on the basis of the right and left pair of the first lines and the second and third lines. More specifically, in this embodiment, the second algorithm calculates the first lane width of the lane on the basis of the right and left pair of the first lines calculated by the line extraction processing section 42, and calculates the second lane width of the lane on the basis of the second and third lines calculated by the line extraction processing section 42. In the case where the difference between these calculated first lane width and second lane width (for example, the subtraction result acquired by subtracting the second lane width from the first lane width) does not fall within the specified second range based on the code, the second algorithm finally calculates the right and left pair of the primary lines on the road on the basis of the right and left pair of the first lines and the second and third lines. For example, in the case where the code is the above-described order, the specified second range based on the code is 0.1 m to 0.65 m.

The third algorithm is an algorithm that regards the second line as the auxiliary line, and estimates the primary line as an estimated line on the basis of the second line and the specified distance, so as to finally calculate the primary line on the road on the basis of the first line and the estimated line, in this embodiment, an algorithm that regards at least one of the second and third lines as the auxiliary line, and estimates the primary line related to at least one of the second and third lines, which is regarded as the auxiliary line, as the estimated line on the basis of at least one of the second and third lines, which is regarded as the auxiliary line, and the specified distance, so as to finally calculate the right and left pair of the primary lines on the road on the basis of the right and left pair of the first lines and the estimated line related to at least one of the second and third lines, which is regarded as the auxiliary line. More specifically, in this embodiment, the third algorithm calculates the first lane width of the lane on the basis of the right and left pair of the first lines calculated by the line extraction processing section 42, and calculates the second lane width of the lane on the basis of the second and third lines calculated by the line extraction processing section 42. In the case where the difference between these calculated first lane width and second lane width (for example, the subtraction result acquired by subtracting the second lane width from the first lane width) falls within the specified second range based on the code, the third algorithm regards at least one of the second and third lines calculated by the line extraction processing section 42 as the auxiliary line, and estimates the primary line related to at least one of the second and third lines, which is regarded as the auxiliary line, as the estimated line on the basis of at least one of the second and third lines, which is regarded as the auxiliary line, and the specified distance, so as to finally calculate the right and left pair of the primary lines on the road on the basis of the right and left pair of the first lines calculated by the line extraction processing section 42 and the estimated line related to at least one of the second and third lines, which is regarded as the auxiliary line.

The fourth algorithm is an algorithm that sets, of the second and third lines calculated by the line extraction processing section 42, one that corresponds to the first line as a fourth line in the case where the line extraction processing section 42 calculates, as the first line, one of the right and left pair of the primary lines on the road from the front image, that regards the fourth line as the auxiliary line in the case where the fourth line is located on the inner side from the first line by the specified third range based on the specified code for a specified time or longer and in the case where the fourth line is located on the inner side from the first line by the specified fourth range based on the code, and that estimates the one of the primary lines as the estimated line on the basis of the fourth line and the specified distance, so as to finally calculate one of the right and left pair of the primary lines on the road on the basis of the one first line and the estimated line. The specified time is a time required to recognize that the line extracted by the line extraction processing section 42 is neither erroneous detection nor noise but the line, and is appropriately set on the basis of multiple samples, for example. Furthermore, in the case where the fourth line is not located on the inner side from the first line by the third range for the specified time or longer and/or in the case where the fourth line is not located on the inner side from the first line by the fourth range, and in the case where the fourth line is located on the inner side from the first line by the fourth range, this fourth algorithm regards the fourth line as the crosswalk line, and finally calculates one of the right and left pair of the primary lines on the road by the one first line itself. Furthermore, in the case where the fourth line is not located on the inner side from the first line by the third range for the specified time or longer and/or in the case where the fourth line is not located on the inner side from the first line by the fourth range, and in the case where the fourth line is not located on the inner side from the first line by the fourth range, this fourth algorithm finally calculates one of the right and left pair of the primary lines on the road on the basis of the fourth line and the one first line. For example, in the case where the code is the above-described order, the specified third range based on the code is 0.1 m to 1 m, and the specified fourth range based on the code is 0.1 m to 0.35 m.

In the case where the line extraction processing section 42 extracts the right and left pair of the first lines, the second line, and the third line from the front image, the right-side image, and the left-side image, the first line processing section 431 uses the first to third algorithms to finally calculate the right and left pair of the primary lines on the road on the basis of these right and left pair of the first lines, second line, and third line.

In the case where the line extraction processing section 42 only extracts the left first line of the right and left pair of the first lines and the third line from the front image, the right-side image, and the left-side image (in the case where at least one of the right first line and the second line cannot be extracted), the second line processing section 432 uses the fourth algorithm to finally calculate the right and left pair of the primary lines on the road on the basis of these left first line and third line.

In the case where the line extraction processing section 42 only extracts the right first line of the right and left pair of the first lines and the second line from the front image, the right-side image, and the left-side image (in the case where at least one of the left first line and the third line cannot be extracted), the third line processing section 433 uses the fourth algorithm to finally calculate the right and left pair of the primary lines on the road on the basis of these right first line and second line.

In the case where the line extraction processing section 42 only extracts the right and left pair of the first lines from the front image, the right-side image, and the left-side image (in the case where the second and third lines cannot be extracted), the fourth line processing section 434 sets these extracted right and left pair of the first lines as the right and left pair of the primary lines on the road, so as to finally calculate the right and left pair of the primary lines on the road.

The lane processing section 435 calculates the lane where the host vehicle travels on the basis of the right and left pair of the primary lines on the road extracted by the first to fourth line processing sections 431 to 434.

Note that the lane detection processing section 43 corresponds to an example of the line determination processing section.

The warning processing section 44 warns about the lane departure by using the output unit 5 on the basis of the final right and left pair of the primary lines on the road, which are calculated by the lane detection processing section 43 as the example of the line determination processing section.

The steering processing section 45 controls steering by using the steering actuator 6 such that the host vehicle keeps the lane on the basis of the final right and left pair of the primary lines on the road, which are calculated by the lane detection processing section 43 as the example of the line determination processing section.

Figure 2:
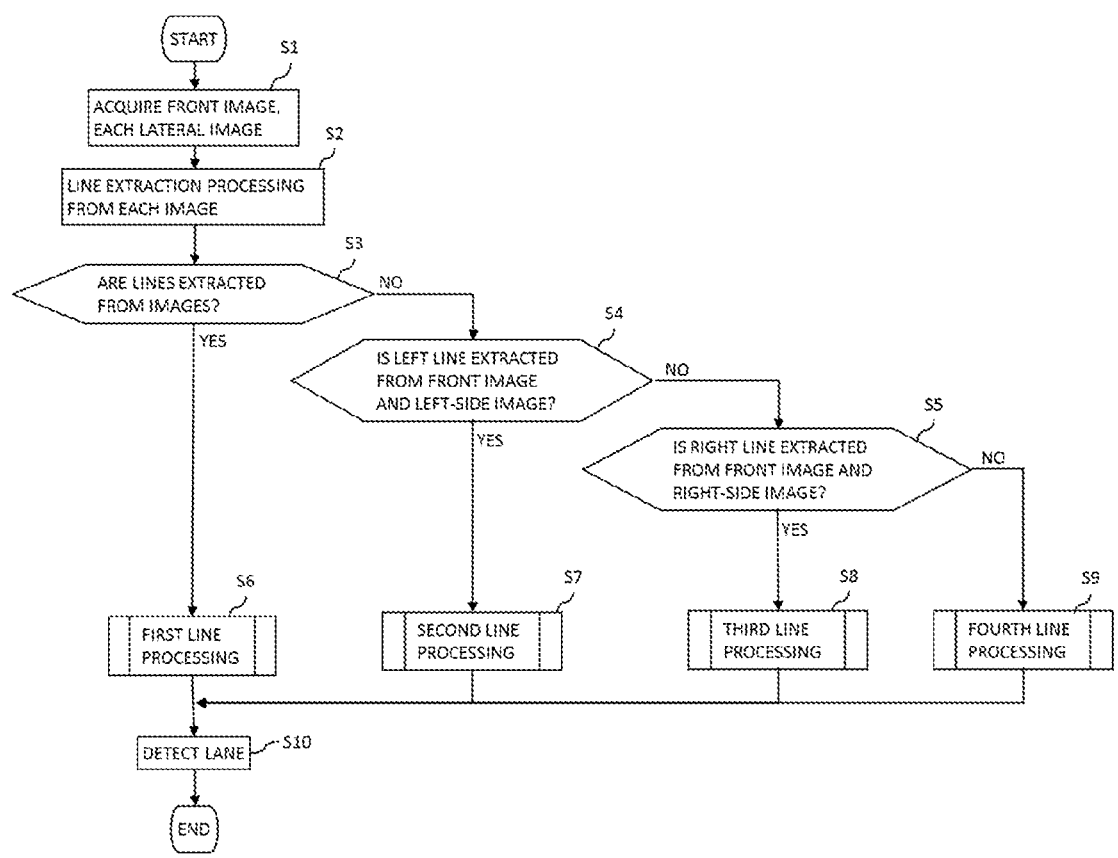
FIG. 2 is a flowchart illustrating overall operation related to line detection by the line detector for the vehicle.
Figure 3:
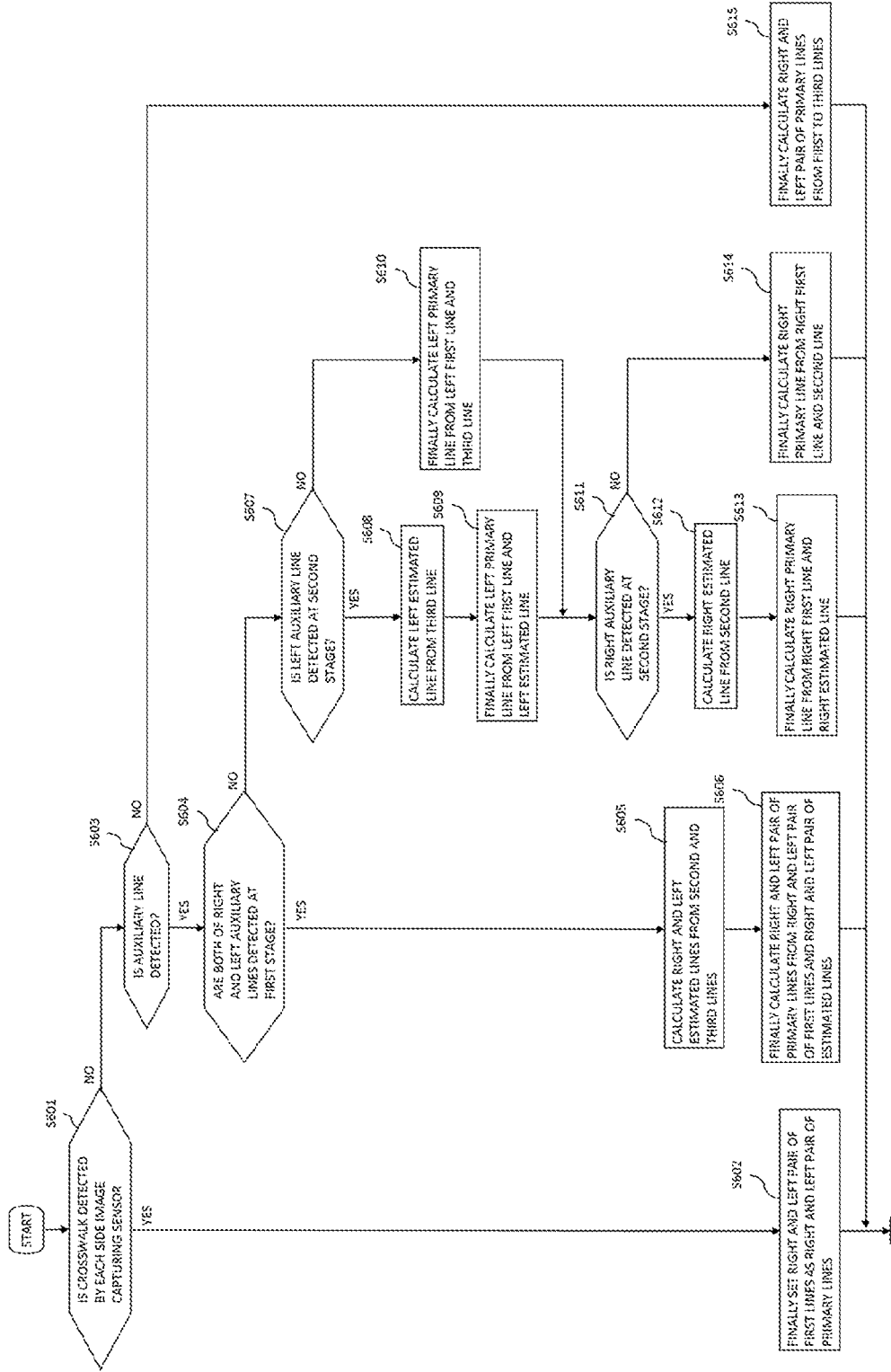
FIG. 3 is a flowchart illustrating operation of first line processing in the overall operation.
Figure 4:
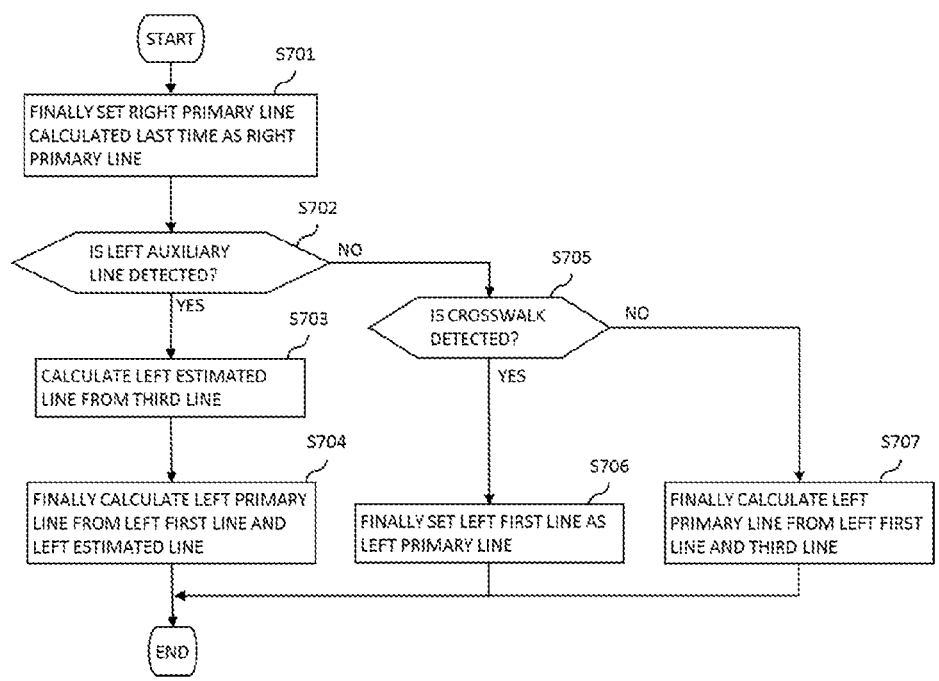
FIG. 4 is a flowchart illustrating operation of second line processing in the overall operation.
Figure 5:
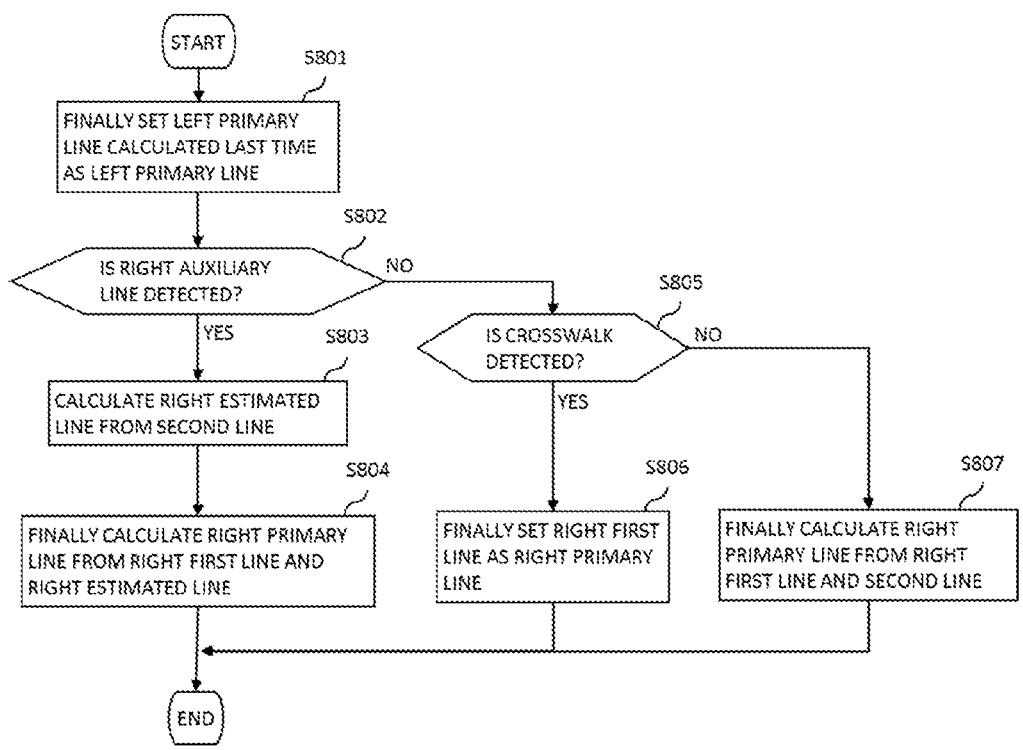
FIG. 5 is a flowchart illustrating operation of third line processing in the overall operation.

Next, a description will be made on operation of the line detector for the vehicle LD in this embodiment. FIG. 2 is a flowchart illustrating overall operation related to line detection by the line detector for the vehicle. FIG. 3 is a flowchart illustrating operation of first line processing in the overall operation. FIG. 4 is a flowchart illustrating operation of second line processing in the overall operation. FIG. 5 is a flowchart illustrating operation of third line processing in the overall operation. FIGS. 6A-6C are views illustrating the operation related to the line detection in the overall operation. FIG. 6A illustrates a case where a right and left pair of primary lines LR, LL on the road are captured in a front visual field FV of the front image capturing sensor 1, a right-side visual field RV of the right-side image capturing sensor 2, and a left-side visual field LV of the left-side image capturing sensor 3. FIG. 6B illustrates a case where the right and left pair of the primary lines LR, LL on the road are captured in each of the front visual field FV of the front image capturing sensor 1, the right-side visual field RV of the right-side image capturing sensor 2, and the left-side visual field LV of the left-side image capturing sensor 3 and crosswalk line WL is further captured in each of the right-side visual field RV of the right-side image capturing sensor 2 and the left-side visual field LV of the left-side image capturing sensor 3. FIG. 6C illustrates a case where the right and left pair of the primary lines LR, LL on the road and auxiliary lines LCR, LCL, which are respectively parallel with the right and left pair of the primary lines LR, LL, are captured in each of the front visual field FV of the front image capturing sensor 1, the right-side visual field RV of the right-side image capturing sensor 2, and the left-side visual field LV of the left-side image capturing sensor 3.

When power is on, such a line detector for the vehicle LD initializes each of the necessary units to start activation. The control processor 4 is configured to functionally include the control section 41, the line extraction processing section 42, the lane detection processing section 43, the warning processing section 44, and the steering processing section 45 as the result of the execution of the control processing programs. The lane detection processing section 43 is configured to functionally include the first line processing section 431, the second line processing section 432, the third line processing section 433, the fourth line processing section 434, and the lane processing section 435. The front image capturing sensor 1, the right-side image capturing sensor 2, and the left-side image capturing sensor 3 are substantially synchronized with each other in accordance with the control by the control processor 4, generate the front image, the right-side image, and the left-side image at a specified frame rate or specified sampling intervals, and output these generated front image, right-side image, and left-side image to the control processor 4. Then, the control processor 4 is operated as follows per frame, per several frames, or per sampling interval to detect the right and left pair of the primary lines on the road and detect the lane where the host vehicle travels.

In FIG. 2, firstly, in the line detector for the vehicle LD, the control section 41 in the control processor 4 acquires the front image, the right-side image, and the left-side image, which are substantially synchronized with each other, from each of the front image capturing sensor 1, the right-side image capturing sensor 2, and the left-side image capturing sensor 3 (S1).

Next, in the line detector for the vehicle LD, the line extraction processing section 42 in the control processor 4 executes extraction processing to extract the line from each of the front image, the right-side image, and the left-side image (S2).

Next, in the line detector for the vehicle LD, the lane detection processing section 43 in the control processor 4 determines whether the right and left pair of the first lines, the second line, and the third line are extracted from each of the front image, the right-side image, and the left-side image (S3). As a result of this determination, if the right and left pair of the first lines, the second line, and the third line are extracted (YES), the lane detection processing section 43 execute first line processing S6 and thereafter executes processing S10. This first line processing S6 is processing to select the first to third algorithms and use these selected first to third algorithms to finally calculate the right and left pair of the primary lines on the road on the basis of these right and left pair of the first lines, second line, and third line by the first line processing section 431, and will be described later in detail with reference to FIG. 3. On the other hand, as the result of the determination, if none of the right and left pair of the first lines, the second line, and the third line is extracted (NO), the lane detection processing section 43 next executes processing S4.

In this processing S4, in the line detector for the vehicle LD, the lane detection processing section 43 in the control processor 4 determines whether the left first line of the right and left pair of the first lines and the third line are extracted from each of the front image, the right-side image, and the left-side image. As a result of this determination, if the left first line and the third line are extracted (YES), the lane detection processing section 43 executes second line processing S7 and thereafter executes processing S10. This second line processing S7 is processing to select the fourth algorithm and use this selected fourth algorithm to finally calculate the right and left pair of the primary lines on the road on the basis of these left first line and third line by the second line processing section 432, and will be described later in detail with reference to FIG. 4. On the other hand, as the result of the determination, if at least one of the left first line and the third line is not extracted (NO), the lane detection processing section 43 next executes processing S5.

In this processing S5, in the line detector for the vehicle LD, the lane detection processing section 43 in the control processor 4 determines whether the right first line of the right and left pair of the first lines and the second line are extracted from each of the front image, the right-side image, and the left-side image. As a result of this determination, if the right first line and the second line are extracted (YES), the lane detection processing section 43 executes third line processing S8 and thereafter executes processing S10. This third line processing S8 is processing to select the fourth algorithm and use this selected fourth algorithm to finally calculate the right and left pair of the primary lines on the road on the basis of these right first line and second line by the third line processing section 433, and will be described later in detail with reference to FIG. 5. On the other hand, as the result of the determination, if at least one of the right first line and the second line is not extracted (NO), the lane detection processing section 43 next executes processing S9.

In this processing S9, in the line detector for the vehicle LD, the fourth line processing section 434 of the lane detection processing section 43 in the control processor 4 executes fourth line processing to set the right and left pair of the first lines, which are extracted in processing S2, as the right and left pair of the primary lines on the road so as to finally calculate the right and left pair of the primary lines on the road, and thereafter executes processing S10.

In this processing S10, in the line detector for the vehicle LD, the lane processing section 435 of the lane detection processing section 43 in the control processor 4 calculates the lane where the host vehicle travels on the basis of the right and left pair of the primary lines on the road, which are extracted by the first to fourth line processing sections 431 to 434. That is, the lane processing section 435 sets a space between the right and left pair of the primary lines on the road, which is extracted by the first to fourth line processing sections 431 to 434, as the lane where the host vehicle travels. As a result of this calculation of the lane, in the case where the host vehicle departs from the lane, the line detector for the vehicle LD causes the warning processing section 44 in the control processor 4 to warn about the lane departure by using the output unit 5. On the other hand, in the case where the host vehicle does not depart from the lane, the line detector for the vehicle LD does not cause the warning processing section 44 in the control processor 4 to warn about the lane departure by using the output unit 5. Then, in the line detector for the vehicle LD, the steering processing section 45 in the control processor 4 causes the steering actuator 6 to control steering such that the host vehicle keeps the lane.

In this way, the processing to detect the right and left pair of the primary lines on the road and detect the lane where the host vehicle travels at current timing is terminated. At next timing, the processing to detect the right and left pair of the primary lines on the road and detect the lane where the host vehicle travels, which is similar to the above, is initiated.

Next, a description will be made on first line processing S6. This first line processing S6 is processing to determine whether each of the second and third lines is the primary line (the roadway center line or the lane boundary line), the auxiliary line, or the crosswalk line by using a fact that the roadway center line (a center line), the lane boundary line (a lane marking), and the auxiliary line are marked on the road surface in accordance with the specified code, in this embodiment, the traffic sign and the orders related to the mark line and the traffic sign based on the Road Act of Japan in the case where the right and left pair of the first lines are extracted from the front image, the second line is extracted from the right-side image, and the third line is extracted from the left-side image, and to finally calculate the right and left pair of the primary lines on the road on the basis of the right and left pair of the first lines, the second line, and the third line by using this determination result.

More specifically, in FIG. 3, firstly, the line detector for the vehicle LD determines whether the crosswalk line is detected by the right-side image capturing sensor 2 and the left-side image capturing sensor 3 (S601). In detail, because the right and left pair of the first lines, the second line, and the third line are detected, in order to check presence or absence of the detection of the crosswalk, the first algorithm is first selected, and the first line processing section 431 executes this selected first algorithm. That is, for example, a host vehicle VC is in one of a first situation illustrated in FIG. 6A, a second situation illustrated in FIG. 6B, and a third situation illustrated in FIG. 6C. Accordingly, the first line processing section 431 first calculates the first lane width of the lane on the basis of the right and left pair of the first lines, the second lane width of the lane on the basis of the second and third lines. Then, the first line processing section 431 determines whether the difference between these calculated first lane width and second lane width (for example, the subtraction result acquired by subtracting the second lane width from the first lane width) falls within the first range, whether the second line is located on the inner side from one (the right first line in this embodiment) of the right and left pair of the first lines by the threshold value or greater, and whether the third line is located on the inner side from the other (the left first line in this embodiment) of the right and left pair of the first lines by the threshold value or greater. Next, as a result of this determination, if the subtraction result falls within the first range, or if the second line is located on the inner side from the one first line (the right first line herein) by the threshold value or greater and/or if the third line is located on the inner side from the other first line (the left first line herein) by the threshold value or greater (YES, that is, if the host vehicle VC is in the second situation illustrated in FIG. 6B and the crosswalk WL is detected), the first line processing section 431 next executes processing in S602, and thereafter terminates this first line processing S6. On the other hand, as the result of the determination, if the subtraction result does not fall within the first range, or if the second line is not located on the inner side from the one first line by the threshold value or greater and if the third line is not located on the inner side from the first line by the threshold value or greater (NO, that is, for example, if the host vehicle VC is in the first situation illustrated in FIG. 6A or the third situation illustrated in FIG. 6C and at least the crosswalk WL is not detected), the first line processing section 431 terminates the processing of the first algorithm, and next executes processing S603.

In this processing S602, the first line processing section 431 regards the second and third lines as the crosswalk lines, sets the right and left pair of the first lines as the right and left pair of the primary lines on the road to finally calculate the right and left pair of the primary lines on the road, and terminates the processing of the first algorithm.

In processing S603, the line detector for the vehicle LD determines whether the auxiliary line is detected by the right-side image capturing sensor 2 and the left-side image capturing sensor 3 (S603). In detail, because the right and left pair of the first lines, the second line, and the third line are detected and the crosswalk is not detected in processing S601, in order to check presence or absence of the detection of the auxiliary line, the second algorithm is next selected, and the first line processing section 431 executes this selected second algorithm. That is, similar to the above, the first line processing section 431 first calculates the first and second lane widths. Next, the first line processing section 431 determines whether the difference between these calculated first lane width and second lane width (for example, the subtraction result) falls within the second range. Next, as a result of this determination, if the subtraction result does not fall within the second range (NO, that is, if the host vehicle VC is in the first situation illustrated in FIG. 6A and at least the auxiliary lines LCL, LCR are not detected), the first line processing section 431 next executes processing in S615, and thereafter terminates this first line processing S6. On the other hand, as the result of the determination, if the subtraction result falls within the second range (YES, that is, for example, if the host vehicle VC is in the third situation illustrated in FIG. 6C and at least one of the auxiliary lines LCL, LCR is detected), the first line processing section 431 next executes processing S604.

In this processing S615, the first line processing section 431 regards the second and third lines as the right and left pair of the primary lines, finally calculates the right and left pair of the primary lines on the road on the basis of the right and left pair of the first lines and the second and third lines, and terminates the processing of the second algorithm. For example, the first line processing section 431 calculates a first position of each of the right and left pair of the first lines, calculates second and third positions of the second and third lines, and calculates an average position between each of these calculated first positions and corresponding one of the second and third positions (an average position between the first position of the right first line and the second position and an average position between the first position of the left first line and the third position) as a position of each of the right and left pair of the primary lines on the road, so as to finally calculate the right and left pair of the primary lines on the road. Note that a weighted average position may be calculated with weight corresponding to line extraction accuracy that varies due to a product variation in the front image capturing sensor 1, the right-side image capturing sensor 2, and the left-side image capturing sensor 3, or the like.

The existence of the auxiliary line is determined in above-described processing S603, the third algorithm is selected in processing S603 to processing S614, the auxiliary line and the primary line are estimated as the estimated lines by the third algorithm, and the primary line is finally calculated on the basis of these estimated lines. That is, in these processing S603 to processing S614, the first line processing section 431 regards at least one of the second and third lines as the auxiliary line, estimates the primary line related to at least one of the second and third lines, which is regarded as the auxiliary line, as the estimated line on the basis of at least one of the second and third lines, which is regarded as the auxiliary line, and the specified distance, and finally calculates the right and left pair of the primary lines on the road on the basis of the right and left pair of the first lines and the estimated line related to at least one of the second and third lines, which is regarded as the auxiliary line.

More specifically, while the existence of the auxiliary line is determined in processing S603 as described above, it is unclear whether the auxiliary line exists for each of the right and left pair of the primary lines or whether the auxiliary line exists for one of the right and left pair of the primary lines. Accordingly, in processing S604, as a determination at a first stage, the line detector for the vehicle LD determines whether the auxiliary line exists for each of the right and left pair of the primary lines. In detail, the first line processing section 431 determines whether the second line is located on the inner side from the right first line of the right and left pair of the first lines by the specified fourth range based on the code and whether the third line is located on the inner side from the left first line of the right and left pair of the first lines by the fourth range. As a result of this determination, if the second line is located on the inner side from the right first line by the fourth range and the third line is located on the inner side from the left first line by the fourth range (YES), the first line processing section 431 next sequentially executes processing S605 and processing S606, and terminates the processing of the third algorithm. On the other hand, as the result of the determination, if the second line is not located on the inner side from the right first line by the fourth range and/or if the third line is not located on the inner side from the left first line by the fourth range (NO), the first line processing section 431 next executes processing S607.

In this processing S605, the first line processing section 431 regards each of the second and third lines as the auxiliary line, estimates the right primary line as a right estimated line on the basis of the second line and the specified distance, and estimates the left primary line as a left estimated line on the basis of the third line and the specified distance.

In processing S606 following this processing S605, the first line processing section 431 finally calculates the right and left pair of the primary lines on the road on the basis of the right and left pair of the first lines and the right and left estimated lines calculated in processing S605, and terminates the processing of the third algorithm. For example, the first line processing section 431 calculates the first position of each of the right and left pair of the first lines, calculates a position of each of the right and left estimated lines calculated in processing S605, and calculates an average position between each of these calculated first positions of the right and left pair of the first lines and the position of corresponding one of the right and left estimated lines calculated in processing S605 (an average position between the first position of the right first line and the position of the right estimated line and an average position between the first position of the left first line and the position of the left estimated line) as the position of each of the right and left pair of the primary lines on the road, so as to finally calculate the right and left pair of the primary lines on the road.

On the other hand, in processing S607, as a determination at a second stage, the line detector for the vehicle LD determines whether the auxiliary line exists for the left primary line. In detail, the first line processing section 431 determines whether the third line is located on the inner side from the left first line of the right and left pair of the first lines by the fourth range. As a result of this determination, if the third line is located on the inner side from the left first line by the fourth range, it is determined that the left auxiliary line exists (YES). Next, the first line processing section 431 sequentially executes processing S608 and processing S609, and thereafter executes processing S611. On the other hand, as the result of the determination, if the third line is not located on the inner side from the left first line by the fourth range, it is determined that the left auxiliary line does not exist (NO). Next, the first line processing section 431 sequentially executes processing S610, and thereafter executes processing S611.

In this processing S608, the first line processing section 431 regards the third line as the auxiliary line, and estimates the left primary line as the left estimated line on the basis of the third line and the specified distance.

In processing S609 following this processing S608, the first line processing section 431 finally calculates the left primary line of the right and left pair of the primary lines on the road on the basis of the left first line of the right and left pair of the first lines and the left estimated line calculated in processing S608, and terminates the processing of the third algorithm.

In processing S610, the first line processing section 431 regards the third line as the left primary line, finally calculates the left primary line of the right and left pair of the primary lines on the road on the basis of the left first line of the right and left pair of the first lines and this third line, which is regarded as the left primary line, and terminates the processing of the third algorithm.

As described above, the left primary line is finally calculated on the basis of the left first line and the third line by processing S607 to processing S610. The right primary line is finally calculated on the basis of the right first line and the second line by processing S611 to processing S614. Accordingly, each processing of processing S611 to processing S614 can be described in a similar manner to each processing of processing S607 to processing S610 by replacing "left" with "right" and replacing "third" to "second". Thus, the description thereon will not be made.

First line processing S6 is executed by such processing.

Next, a description will be made on second line processing S7. This second line processing S7 is processing to use a fact that the roadway center line, the lane boundary line, and the auxiliary line are marked on the road surface in accordance with the specified code in the case where the left first line is extracted from the front image and the third line is extracted from the left-side image, to thereby determine whether the third line is the primary line (the roadway center line or the lane boundary line), the auxiliary line, or the crosswalk line, and to use this determination result, so as to finally calculate the left primary line of the right and left pair of the primary lines on the road on the basis of the left first line and the third line.

More specifically, in FIG. 4, firstly, because the right primary line is not processed, the line detector for the vehicle LD sets the right primary line that is calculated last time as the final right primary line (S701).

Next, the line detector for the vehicle LD determines whether the left auxiliary line is detected by the left-side image capturing sensor 3 (S702). In detail, because the left first line and the third line are extracted, in order to finally calculate the left primary line, the fourth algorithm is selected, and the second line processing section 432 executes this selected fourth algorithm. That is, the second line processing section 432 first determines whether the third line is located on the inner side from the left first line by the third range for the specified time or longer and whether the third line is located on the inner side from the left first line by the fourth range. As a result of this determination, if the third line is located on the inner side from the left first line by the third range for the specified time or longer and the third line is located on the inner side from the left first line by the fourth range, the second line processing section 432 determines that the left auxiliary line exists (YES). Next, the second line processing section 432 sequentially executes processing S703 and processing S704, and terminates the processing of the fourth algorithm. On the other hand, as the result of the determination, if the third line is not located on the inner side from the left first line by the third range for the specified time or longer and/or if the third line is not located on the inner side from the left first line by the fourth range, the second line processing section 432 determines that the left auxiliary line does not exist (NO), the second line processing section 432 next executes processing S705.

In this processing S703, the second line processing section 432 regards the third line as the auxiliary line, and estimates the left primary line as the left estimated line on the basis of the third line and the specified distance.

In processing S704 following this processing S703, the second line processing section 432 finally calculates the left primary line of the right and left pair of the primary lines on the road on the basis of the left first line of the right and left pair of the first lines and the left estimated line calculated in processing S703, and terminates the processing of the fourth algorithm.

Meanwhile, in processing S705, the line detector for the vehicle LD determines whether the crosswalk line is detected by the left-side image capturing sensor 3. In detail, the second line processing section 432 determines whether the crosswalk line is located on the inner side from the left first line by the third range. As a result of this determination, if the crosswalk line is located on the inner side from the left first line by the third range (YES, that is, if the crosswalk is detected), the second line processing section 432 next executes processing S706, and terminates the processing of the fourth algorithm. On the other hand, as the result of the determination, if the crosswalk line is not located on the inner side from the left first line by the third range (NO), the second line processing section 432 next executes processing S707, and terminates the processing of the fourth algorithm.

In this processing S706, the second line processing section 432 regards the third line as the crosswalk line and sets the left first line itself as the left primary line of the right and left pair of the primary lines on the road, so as to finally calculate the left primary line.

In this processing S707, the second line processing section 432 regards the third line as the left primary line, and finally calculates the left primary line of the right and left pair of the primary lines on the road on the basis of the left first line of the right and left pair of the first lines and the third line, which is regarded as the left primary line.

Second line processing S7 is executed by such processing.

As described above, in order to finally calculate the left primary line on the basis of the left first line and the third line, second line processing S7 is executed by processing S701 to processing S707. In order to finally calculate the right primary line on the basis of the right first line and the second line, third line processing S8 is executed by processing S801 to processing S807 illustrated in FIG. 5. Accordingly, each processing of processing S801 to processing S807 can be described in a similar manner to each processing of processing S701 to processing S707 by replacing the "second line processing section 432" with the "third line processing section 433", replacing "left" to "right" and replacing "third" to "second". Thus, the description thereon will not be made.

As it has been described so far, the line detector for the vehicle LD in this embodiment and a method for detecting a line for a vehicle implemented therein select one algorithm from the multiple mutually-different algorithms for determining the line on the road, and finally calculate the lines on the road (in this embodiment, the right and left pair of the primary lines) on the basis of the first to third lines by using this selected algorithm. Thus, the algorithm that is suited to finally calculate the lines on the road can be selected from the multiple algorithms, and the lines on the road can be detected with a high degree of accuracy by using this suited algorithm.

In the case where the first algorithm is used, the above line detector for the vehicle LD and the method set the right and left pair of the first lines as the right and left pair of the primary lines on the road without using the second and third lines regarded as the secondary line (without using the second and third lines regarded as the crosswalk lines even in the case where the crosswalk lines are marked on the road surface, for example). Thus, the right and left pair of the primary lines on the road representing the boundaries of the lane can be detected with the high degree of accuracy.

In the case where the second algorithm is used, the above line detector for the vehicle LD and the method use not only the right and left pair of the first lines but also the second and third lines regarded as the right and left pair of the primary lines. Thus, the right and left pair of the lines on the road can be detected with the high degree of accuracy.

In the case where the third algorithm is used, the above line detector for the vehicle LD and the method estimate the primary line as the estimated line on the basis of at least one of the second and third lines, which are regarded as the auxiliary lines, and use not only the right and left pair of the first lines but also this estimated line. Thus, the right and left pair of the lines on the road can be detected with the high degree of accuracy.

In the case where the fourth algorithm is used and one of the right and left pair of the primary lines is calculated, the above line detector for the vehicle LD and the method estimate the one primary line as the estimated line on the basis of the fourth line regarded as the auxiliary line, and use not only the one first line but also this estimated line. Thus, the right and left pair of the primary lines on the road can be detected with the high degree of accuracy. Even in the case where the crosswalk line is marked near the one primary line on the road surface, one of the right and left pair of the primary lines on the road is finally calculated by using the one first line itself. Thus, the line detector for the vehicle LD and the method can detect the right and left pair of the lines on the road with the high degree of accuracy. In regard to the one primary line, not only the one first line but also the fourth line regarded as the primary line are used. Thus, the right and left pair of the primary lines on the road can be detected with the high degree of accuracy.

Note that, in the above-described embodiment, the line detector for the vehicle LD finally calculates the right and left pair of the primary lines on the road at the current timing on the basis of the first to third lines extracted at the current timing; however, the line detector for the vehicle LD may finally calculate the right and left pair of the primary lines on the road at the current timing on the basis of not only the first to third lines extracted at the current timing but also the right and left pair of the primary lines on the road finally calculated at the last timing. In this way, a relatively significant shift of the primary line between timings can favorably be reduced, and thus the primary line can be detected relatively smoothly between the timings. For example, the right and left pair of the primary lines on the road at the current timing may finally be calculated by calculating differences (a difference between the one (for example, right) primary lines and a difference between the other (for example, left) primary lines) between the right and left pair of the primary lines on the road at the current timing (the position of each of the right and left pair of the primary lines), which are finally calculated on the basis of the first to third lines extracted at the current timing, and the right and left pair of the primary lines on the road (the position of each of the right and left pair of the primary lines), which are finally calculated at the last timing, multiplying each of the differences by a specified constant (a control gain), which is set in advance, and adding a multiplication result (a correction value) to each of the right and left pair of the primary lines on the road, which is finally calculated at the last timing.

In order to express the present disclosure, the appropriate and sufficient description has been made above on the present disclosure through the embodiment with reference to the drawings. It should be recognized that a person skilled in the art could have easily arrived at modifications and/or improvements of the above-described embodiment. Therefore, as long as a change mode or an improvement mode implemented by the person skilled in the art is not at such a level that departs from the scope of the rights of the claims described in the claims, it is interpreted that such a change mode or such an improvement mode is included in the scope of the rights of the claims.

What is claimed is:

1. A line detector for a vehicle, the vehicle including a first image capturing sensor that is mounted on a vehicle and is configured to capture an image in front of the vehicle in a manner to include a road surface, so as to generate a front image, and a second image capturing sensor that is mounted on the vehicle and is configured to capture an image on one lateral side of the vehicle in the manner to include the road surface, so as to generate one lateral image, and the line detector comprising:
   a control processor configured to
      calculate a line marked on a road surface as a first line from the front image generated by the first image capturing sensor;
      calculate the line marked on the road surface as a second line from the one lateral image generated by the second image capturing sensor; and
      select one algorithm from multiple mutually-different algorithms for determining what is represented by the line marked on the road surface, responsive to the first and second lines respectively calculated, so as to calculate the line marked on the road surface using the first and second lines and the selected algorithm;
   wherein the vehicle further includes a third image capturing sensor that is mounted on the vehicle and is configured to capture an image on an other lateral side of the vehicle in the manner to include the road surface, so as to generate an other lateral image; and
   the control processor is further configured to
      calculate the line marked on the road surface as a third line from the other lateral image generated by the third image capturing sensor; and
      select the one algorithm from the multiple algorithms responsive to the first to third lines respectively calculated, and calculate the line marked on the road surface using the first to third lines and the selected algorithm;
   wherein the lines marked on the road surface include a right and left pair of a primary lines representing boundaries of a lane; and a secondary line other than the right and left pair of the primary lines; and
   the control processor is further configured to
      calculate the right and left pair of the primary lines on the road as a right and left pair of the first lines from the front image captured by the first image capturing sensor; and
      select one algorithm from the multiple algorithms responsive to the right and left pair of the first lines, the second line, and the third line, and calculate the right and left pair of the primary lines marked on the road surface using the right and left pair of the first lines, the second line, the third line, and the selected algorithm.

2. The line detector for the vehicle according to claim 1, wherein
   the multiple algorithms include a first algorithm that regards the second and third lines as the secondary lines, and sets the right and left pair of the first lines as the right and left pair of the primary lines marked on the road surface, so as to calculate the right and left pair of the primary lines marked on the road surface.

3. The line detector for the vehicle according to claim 2, wherein
   the secondary line includes a crosswalk line that represents a crosswalk and includes multiple lines marked based on a specified code, and
   the first algorithm
      calculates a first lane width of the lane using the right and left pair of the first lines,
      calculates a second lane width of the lane using the second and third lines,
      regards the second and third lines as the crosswalk lines in at least one of the following cases
         where a difference between the first lane width and the second lane width falls within a specified first range according to the specified code,
         where the second line is located on an inner side from one first line of the right and left pair of the first lines by a specified threshold value according to the specified code or greater, and
         where the third line is located on an inner side from the other first line of the right and left pair of the first lines by the threshold value or greater; and
      sets the right and left pair of the first lines as the right and left pair of the primary lines marked on the road surface, so as to finally calculate the right and left pair of the primary lines marked on the road surface.

4. The line detector for the vehicle according to claim 3, wherein
   the right and left pair of the primary lines marked on the road surface are a roadway center line and a lane boundary line or a pair of the lane boundary lines marked according to the specified code, and
   the multiple algorithms include a second algorithm that calculates the first lane width of the lane based on the right and left pair of the first lines, calculates the second lane width of the lane using the second and third lines, and calculates the right and left pair of the primary lines marked on the road surface using the right and left pair of the first lines and the second and third lines in a case where the difference between the first lane width and the second lane width does not fall within a specified second range according to the specified code.

5. The line detector for the vehicle according to claim 3, wherein
   the right and left pair of the primary lines marked on the road surface are a roadway center line and a lane boundary line or a pair of the lane boundary lines marked according to the specified code,
   the secondary line includes an auxiliary line that is parallel with the primary line and is marked at a specified distance from the primary line, and
   the multiple algorithms include a third algorithm that calculates the first lane width of the lane using the right and left pair of the first lines, calculates the second lane width of the lane using the second and third lines, regards at least one of the second and third lines as the auxiliary line in a case where the calculated difference between the first lane width and the second lane width falls within a specified second range according to the specified code, estimates the primary line related to the at least one of the second and third lines, which is regarded as the auxiliary line, as an estimated line using the at least one of the second and third lines regarded as the auxiliary line and the specified distance, and calculates the right and left pair of the primary lines on the road using the right and left pair of the first lines and the estimated line related to the at least one of the second and third lines regarded as the auxiliary line.

6. The line detector for the vehicle according to claim 1, wherein the lines marked on the road surface include a right and left pair of the primary lines representing boundaries of a lane; and a secondary line other than the right and left pair of the primary lines, the secondary line includes an auxiliary line that is parallel with the primary line and is marked at a specified distance from the primary line, the control processor is further configured to calculate one of the right and left pair of the primary lines marked on the road surface as the first line from the front image captured by the first image capturing sensor, and the multiple algorithms include a fourth algorithm that sets, of the second and third lines, the line corresponding to the one of the right and left pair of the primary lines marked on the road surface as a fourth line, regards the fourth line as the auxiliary line in a case where the fourth line is located on an inner side from the first line by a specified third range based on the specified code for a specified time or longer and in a case where the fourth line is located on the inner side from the first line by a specified fourth range according to the code, and estimates the one primary line as an estimated line using the fourth line and the specified distance, so as to calculate one of the right and left pair of the primary lines marked on the road surface using the one first line and the estimated line.

7. The line detector for the vehicle according to claim 6, wherein the secondary line is a crosswalk line that represents a crosswalk and includes multiple lines marked according to the specified code, and in a case where the fourth line is located on the inner side from the first line by the fourth range, and in at least one of the following cases:

the fourth line is not located on the inner side from the first line by the specified third range according to the specified code for the specified time or longer; and the fourth line is not located on the inner side from the first line by the specified fourth range according to the code, then the fourth algorithm further regards the fourth line as the crosswalk line, and calculates one of the right and left pair of the primary lines marked on the road surface by the one first line itself.

8. The line detector for the vehicle according to claim 7, wherein in a case where the fourth line is not located on the inner side from the first line by the fourth range, and in at least one of the following cases:

the fourth line is not located on the inner side from the first line by the specified third range according to the specified code for the specified time or longer, and the fourth line is not located on the inner side from the first line by the specified fourth range according to the code, then the fourth algorithm further calculates one of the right and left pair of the primary lines on the road using the fourth line and the one first line.

9. A method for detecting a line for a vehicle, the method comprising:

capturing an image in front of a vehicle in a manner to include a road surface, so as to generate a front image;

capturing an image on one lateral side of the vehicle in the manner to include the road surface, so as to generate one lateral image;

capturing an image on another lateral side of the vehicle in the manner to include the road surface, so as to generate an other lateral image;

calculating a line marked on a road surface as a first line from the front image generated by the first image capturing;

calculating a line marked on the road surface as a second line from the one lateral image generated by the second image capturing;

calculating a line marked on the road surface as a third line from the other lateral image generated by the third image capturing;

selecting one algorithm from multiple mutually-different algorithms for determining what is represented by the line marked on the road surface responsive to the first and second lines, so as to calculate the line marked on the road surface using the first and second lines and the selected algorithm;

selecting the one algorithm from the multiple algorithms responsive to the first to third lines respectively calculated, and calculating the line marked on the road surface using the first to third lines and the selected algorithm;

wherein the lines marked on the road surface include a right and left pair of a primary lines representing boundaries of a lane; and a secondary line other than the right and left pair of the primary lines;

calculating the right and left pair of the primary lines on the road as a right and left pair of the first lines from the front image generated by the first image capturing; and selecting one algorithm from the multiple algorithms responsive to the right and left pair of the first lines, the second line, and the third line, and calculating the right and left pair of the primary lines marked on the road surface using the right and left pair of the first lines, the second line, the third line, and the selected algorithm.

10. A line detector for a vehicle, the vehicle including a first image capturing sensor that is mounted on a vehicle and is configured to capture an image in front of the vehicle in a manner to include a road surface, so as to generate a front image, and a second image capturing sensor that is mounted on the vehicle and is configured to capture an image on one lateral side of the vehicle in the manner to include the road surface, so as to generate one lateral image, and the line detector comprising:

a control processor configured to calculate a line marked on a road surface as a first line from the front image generated by the first image capturing sensor;

calculate the line marked on the road surface as a second line from the one lateral image generated by the second image capturing sensor; and select one algorithm from multiple mutually-different algorithms for determining what is represented by the line marked on the road surface, responsive to the first and second lines respectively calculated, so as to calculate the line marked on the road surface using the first and second lines and the selected algorithm;

wherein the vehicle further includes a third image capturing sensor that is mounted on the vehicle and is configured to capture an image on another lateral side of the vehicle in the manner to include the road surface, so as to generate an other lateral image; and the control processor is further configured to calculate the line marked on the road surface as a third line from the other lateral image generated by the third image capturing sensor; and select the one algorithm from the multiple algorithms responsive to the first to third lines respectively calculated, and calculate the line marked on the road surface using the first to third lines and the selected algorithm;

wherein the lines marked on the road surface include a right and left pair of the primary lines representing boundaries of a lane; and a secondary line other than the right and left pair of the primary lines, the secondary line includes an auxiliary line that is parallel with the primary line and is marked at a specified distance from the primary line, the control processor is further configured to calculate one of the right and left pair of the primary lines marked on the road surface as the first line from the front image captured by the first image capturing sensor, and the multiple algorithms include a fourth algorithm that sets, of the second and third lines, the line corresponding to the one of the right and left pair of the primary lines marked on the road surface as a fourth line, regards the fourth line as the auxiliary line in a case where the fourth line is located on an inner side from the first line by a specified third range according to the specified code for a specified time or longer and in a case where the fourth line is located on the inner side from the first line by a specified fourth range according to the code, and estimates the one primary line as an estimated line using the fourth line and the specified distance, so as to calculate one of the right and left pair of the primary lines marked on the road surface using the one first line and the estimated line.

\* \* \* \* \*